(12) United States Patent
Miao et al.

(10) Patent No.: US 11,575,578 B2
(45) Date of Patent: Feb. 7, 2023

(54) METHOD AND APPARATUS FOR CONFIGURING TRANSMISSION BANDWIDTH, AND DEVICE

(71) Applicant: DATANG MOBILE COMMUNICATIONS EQUIPMENT CO., LTD., Beijing (CN)

(72) Inventors: Deshan Miao, Beijing (CN); Fang-Chen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 83 days.

(21) Appl. No.: 15/734,970

(22) PCT Filed: Apr. 23, 2019

(86) PCT No.: PCT/CN2019/083954
§ 371 (c)(1),
(2) Date: Dec. 3, 2020

(87) PCT Pub. No.: WO2019/233205
PCT Pub. Date: Dec. 12, 2019

(65) Prior Publication Data
US 2021/0234764 A1 Jul. 29, 2021

(30) Foreign Application Priority Data

Jun. 4, 2018 (CN) .......................... 201810566146.0
Jun. 8, 2018 (CN) .......................... 201810588573.9

(51) Int. Cl.
*H04L 41/0896* (2022.01)
*H04L 5/00* (2006.01)
*H04W 72/04* (2009.01)

(52) U.S. Cl.
CPC ........ *H04L 41/0896* (2013.01); *H04L 5/0048* (2013.01); *H04W 72/042* (2013.01); *H04W 72/0453* (2013.01)

(58) Field of Classification Search
CPC ... H04L 5/0001; H04L 5/0044; H04L 5/0048; H04L 5/0098; H04L 41/0896;
(Continued)

(56) References Cited

U.S. PATENT DOCUMENTS 10,165,582 B2 * 12/2018 Papasakellariou .......................... H04W 72/1205
10,187,191 B2 * 1/2019 Chen .................. H04W 52/0219
(Continued)

FOREIGN PATENT DOCUMENTS

| CN | 101801095 A | 8/2010 |
|---|---|---|
| CN | 102088433 A | 6/2011 |

(Continued)

OTHER PUBLICATIONS

Qualcomm Incorporated,"Open Issues on CA",3GPP TSG RAN WG1 Meeting #91, Reno, NV, USA, Nov. 27-Dec. 1, 2017, total 18 pages, R1-1720694.
(Continued)

*Primary Examiner* — Eric Nowlin
(74) *Attorney, Agent, or Firm* — Kilpatrick Townsend & Stockton, LLP

(57) ABSTRACT

The present application provides a method and apparatus for configuring a transmission bandwidth, and a device, for accelerating an activation speed of a carrier/BWP, reducing waiting time of a UE, and saving power consumption of the UE. The method comprises: determining a first carrier/first BWP; and sending a PDCCH to a user terminal UE by means of a second carrier/second BWP, the PDCCH being used for bearing instruction information for activating the
(Continued)

first carrier/first BWP and sending a reference signal over the first carrier/first BWP, so that the UE may activate the first carrier/first BWP and receive the reference signal, and the reference signal is used by the UE for performing channel measurement and synchronous tracking on the first carrier/first BWP.

15 Claims, 5 Drawing Sheets

(58) Field of Classification Search
CPC ........... H04W 72/042; H04W 72/0453; H04W 72/1289; Y02D 30/70
See application file for complete search history.

(56) References Cited

U.S. PATENT DOCUMENTS

| | | | |
|---|---|---|---|
| 10,588,141 B2* | 3/2020 | Rico Alvarino | H04L 5/0051 |
| 10,616,873 B2* | 4/2020 | McBeath | H04W 72/042 |
| 10,904,870 B2* | 1/2021 | McBeath | H04W 72/042 |
| 10,925,066 B2* | 2/2021 | Davydov | H04W 56/001 |
| 11,026,213 B2* | 6/2021 | McBeath | H04W 72/042 |
| 11,044,710 B2* | 6/2021 | McBeath | H04W 72/042 |
| 11,051,287 B2* | 6/2021 | McBeath | H04W 72/042 |
| 11,089,580 B2* | 8/2021 | McBeath | H04L 5/003 |
| 11,259,316 B2* | 2/2022 | Li | H04W 76/27 |
| 11,277,824 B2* | 3/2022 | Shen | H04L 27/2666 |
| 2012/0230272 A1* | 9/2012 | Kim | H04W 72/0453 370/329 |
| 2014/0023006 A1* | 1/2014 | Jeong | H04W 72/0446 370/329 |
| 2014/0185537 A1* | 7/2014 | Papasakellariou | H04W 72/0453 370/329 |
| 2016/0037543 A1* | 2/2016 | Papasakellariou | H04W 88/02 370/329 |
| 2017/0215198 A1* | 7/2017 | Chen | H04W 52/0219 |
| 2018/0007707 A1* | 1/2018 | Rico Alvarino | H04L 12/56 |
| 2018/0027568 A1* | 1/2018 | Harada | H04J 11/00 370/230 |
| 2018/0098361 A1 | 4/2018 | Ji et al. | |
| 2019/0104543 A1* | 4/2019 | Park | H04L 1/1854 |
| 2019/0110303 A1* | 4/2019 | Papasakellariou | H04W 72/042 |
| 2019/0199555 A1* | 6/2019 | Munier | H04W 72/0453 |
| 2019/0364556 A1* | 11/2019 | Davydov | H04B 7/0695 |
| 2020/0022175 A1* | 1/2020 | Xiong | H04W 72/0453 |
| 2020/0077427 A1* | 3/2020 | Li | H04W 76/27 |
| 2020/0120643 A1* | 4/2020 | Shen | H04W 72/042 |
| 2021/0075488 A1* | 3/2021 | Wu | H04W 24/08 |
| 2021/0167930 A1* | 6/2021 | Jeon | H04L 27/2607 |
| 2021/0184824 A1* | 6/2021 | Kwak | H04L 5/0098 |
| 2021/0212103 A1* | 7/2021 | Lin | H04W 72/1289 |
| 2021/0336750 A1* | 10/2021 | Zhou | H04L 5/0094 |

FOREIGN PATENT DOCUMENTS

| | | | | |
|---|---|---|---|---|
| CN | 102625456 A | | 8/2012 | |
| CN | 101801095 B | * | 3/2013 | |
| CN | 103685119 A | | 3/2014 | |
| CN | 104348591 A | * | 2/2015 | ........... H04L 1/1671 |
| CN | 105578608 A | | 5/2016 | |
| CN | 102625456 B | * | 3/2017 | |
| CN | 107734685 A | | 2/2018 | |
| CN | 108496320 A | * | 9/2018 | ............. H04L 5/001 |
| CN | 108616341 A | * | 10/2018 | ........... H04L 1/0026 |
| CN | 105578608 B | * | 3/2019 | ........ H04W 72/1289 |
| CN | 108616341 B | * | 5/2020 | ........... H04L 1/0026 |
| CN | 108496320 B | * | 4/2021 | ............. H04L 5/001 |
| CN | 110719643 B | * | 4/2021 | ........... H04L 5/0053 |
| CN | 107734685 B | * | 8/2021 | ........... H04L 5/0051 |
| EP | 3568946 A1 | * | 11/2019 | ........... H04B 17/318 |
| EP | 3611866 A1 | * | 2/2020 | ........... H04B 17/318 |
| EP | 3408963 B1 | * | 5/2021 | ............. H04L 5/001 |
| WO | WO-2017132212 A1 | * | 8/2017 | ............. H04L 5/001 |
| WO | WO-2018107886 A1 | * | 6/2018 | ........... H04L 1/0026 |
| WO | WO-2019084570 A1 | * | 5/2019 | ........... H04B 17/318 |

OTHER PUBLICATIONS

NTT Docomo, Inc."Remaining issues on other aspect of carrier aggregation", 3GPP TSG RAN WG1 Meeting 91, Reno, USA, Nov. 2-Dec. 1, 2017, total 11 pages, R1-1720826.

Qualcomm Incorporated,"Remaining Issues on BWP", 3GPP TSG RAN WG1 Meeting #92bis, Sanya, China, Apr. 15-20, 2018, total 24 pages, R1-1804809.

Qualcomm Incorporated,"Remaining Issues on BWP",3GPP TSG RAN WG1 Meeting #92, Athens, Greece, Feb. 261h-Mar. 2, 2018, total 24 pages, R1-1802844.

Qualcomm Incorporated,"Remaining issues on TRS", 3GPP TSG RAN WG1 Meeting #93, Busan, Korea, May 21-25, 2018, total 3 pages, R1-1807350.

* cited by examiner

METHOD AND APPARATUS FOR CONFIGURING TRANSMISSION BANDWIDTH, AND DEVICE The present application is a national phase entry under 35 U.S.C. § 371 of International Application No. PCT/CN2019/083954, filed on Apr. 23, 2019, which claims the priorities from Chinese Patent Application No. 201810566146.0 filed with the China National Intellectual Property Administration on Jun. 4, 2018 and entitled "Method, Apparatus and Device for Configuring Transmission Bandwidth" and Chinese Patent Application No. 201810588573.9 filed with the China National Intellectual Property Administration on Jun. 8, 2018 and entitled "Method, Apparatus and Device for Configuring Transmission Bandwidth", which are hereby incorporated by reference in their entirety.

FIELD

The present application relates to the field of communication technology, and in particular to a method, apparatus and device for configuring a transmission bandwidth.

BACKGROUND

In the 5th-generation (5G) New Radio (NR) system, the power-saving design of the User Equipment (UE) is very important, mainly because the 5G supports the larger bandwidth and more complex services. The power-saving optimal design can save the UE's power consumption, extend the battery life and improve the user experience.

In order to ensure the low power consumption of the UE, in the 5G NR system, the UE can work on the relatively small bandwidth when transmitting small data packets, and the UE can quickly switch to a large bandwidth or multi-carrier mode when a large data packet arrives, so that the working bandwidth of the UE is matched with the service model, obtaining the power saving effect.

In the prior art, when the working bandwidth of the UE is switched, a new carrier is generally activated through Medium Access Control (MAC) layer signaling, but this method has the problem of slow switching, where the UE needs to take a long time to wait for and measure the reference signal for synchronization tracking and channel measurement, and the power consumption is large.

SUMMARY

The embodiments of the present application provide a method, apparatus and device for configuring a transmission bandwidth, to accelerate the activation speed of the carrier/Bandwidth Part (BWP), reduce the waiting time of the UE, and save the power consumption of the UE.

In a first aspect, embodiments of the present application provide a method for configuring a transmission bandwidth, which is applied to a network-side device and includes:

determining a first carrier/first BWP;

sending a Physical Downlink Control Channel (PDCCH) to a User Equipment (UE) through a second carrier/second BWP, the PDCCH carrying indication information for activating the first carrier/first BWP and sending a reference signal over the first carrier/first BWP, to allow the UE to activate the first carrier/first BWP and receives the reference signal; where the reference signal is used by the UE to perform a channel measurement and synchronous tracking on the first carrier/first BWP.

In the above solution, the network-side device instructs the UE to activate a new carrier/BWP and receive a reference signal by sending the PDCCH and using the dynamic Downlink Control Information (DCI) signaling, and the UE performs the channel measurement and synchronous tracking on the new carrier/BWP based on the received reference signal. Compared with the prior art in which MAC layer signaling is used to activate a new carrier/BWP, this solution can be more quick, effectively speed up the switching of the working bandwidth of the UE, reduce the waiting time of the UE, and then save the power of the UE.

In one embodiment, the indication information activating the first carrier/first BWP at least includes an identification (ID) of the first carrier/first BWP.

Through the embodiments, the carrier or BWP that needs to be activated can be clearly indicated.

In one embodiment, sending a PDCCH to a UE through a second carrier/second BWP, includes:

sending one PDCCH to the UE through the second carrier/second BWP, where the one PDCCH is specifically a first PDCCH, to allow the UE to activate the first carrier/BWP and receive the reference signal.

In the embodiments, by sending the first PDCCH to indicate the activation of the new carrier/BWP and simultaneously indicate the transmission of the reference signal on the new carrier/BWP, it can help the UE to quickly complete the synchronous tracking and CSI measurement of the new carrier/BWP, which further speeds up the bandwidth switching, reduces the power consumption of the UE, and also saves the system signaling overhead.

In one embodiment, the first PDCCH further carries a parameter N1 for indicating the timing of sending the reference signal; and the method further includes:

sending the reference signal to the UE through the first carrier/first BWP after N1 slots from sending the first PDCCH to the UE through the second carrier/second BWP.

In the embodiments, the first PDCCH further indicates the timing of sending the reference signal, so that the UE can start to receive the reference signal after N1 slots from receiving the first PDCCH, which not only reserves the time for radio frequency switching of the UE but also clarifies the timing relationship for the UE to receive the reference signal, further speeds up the switching of the UE's working bandwidth, saves the power consumption of the UE, and also saves the system signaling overhead.

In one embodiment, the first PDCCH further carries indication information for scheduling a Physical Downlink Shared CHannel (PDSCH) or Physical Uplink Shared Channel (PUSCH) on the first carrier/first BWP.

In the embodiments, after receiving the first PDCCH, the UE can schedule the PDSCH or PUSCH on the first carrier according to the indication of the first PDCCH, which further accelerates the speed of the UE to switch the working bandwidth, saves the power consumption of the UE, and also saves the system signaling overhead.

In one embodiment, the first PDCCH further carries a parameter N2 for indicating the timing of scheduling the PDSCH or PUSCH; and the method further includes:

starting to send the PDSCH or receive the PUSCH after N2 slots from sending the first PDCCH to the UE through the second carrier/second BWP.

In the embodiments, the first PDCCH further indicates the timing for the network-side device to schedule the PDSCH or PUSCH, so that the UE can receive the PDSCH or PUSCH data after N2 slots from receiving the first PDCCH according to the indication of the first PDCCH, which further accelerates the switching of the UE working bandwidth, saves the power consumption of the UE, and also saves the system signaling overhead.

In one embodiment, the method further includes:

sending a second PDCCH to the UE through the second carrier/second BWP, where the second PDCCH carries indication information for scheduling a PDSCH or PUSCH on the first carrier/first BWP.

In the embodiments, the UE can schedule PDSCH or PUSCH on the first carrier according to the indication information carried by the second PDCCH, so that the carrier activation can be separated from data scheduling, and the network can control the timing of carrier activation flexibly.

In one embodiment, the second PDCCH further carries a parameter N3 for indicating the timing of scheduling the PDSCH or PUSCH;

the method further includes:

starting to send the PDSCH or receive the PUSCH after N3 slots from sending the second PDCCH to the UE through the second carrier/second BWP.

In the embodiments, the second PDCCH further indicates the timing for the network-side device to schedule the PDSCH or PUSCH, so that the UE can receive the PDSCH or send the PUSCH data after N3 slots from receiving the second PDCCH according to the indication of the second PDCCH, which can accurately control the data scheduling time, further speed up the switching of the UE's working bandwidth, and save the power consumption of the UE.

In one embodiment, the sending a PDCCH to a UE through a second carrier/second BWP, includes:

sending a third PDCCH to the UE through the second carrier/second BWP, so that the UE activates the first carrier/BWP;

sending a fourth PDCCH to the UE through the second carrier/second BWP, so that the UE receives the reference signal.

In the embodiments, the third PDCCH and the fourth PDCCH respectively instruct the UE to activate the first carrier/BWP and receive the reference signal, so that the carrier activation and reference signal signaling can be designed independently, which not only allows the dynamic switching to save the activation time but also ensures the flexibility of network configuration.

In one embodiment, the fourth PDCCH further carries a parameter N4 for indicating the timing of sending the reference signal; and the method further includes:

sending the reference signal to the UE through the first carrier/first BWP after N4 slots from sending the fourth PDCCH to the UE through the second carrier/second BWP.

In the embodiments, the fourth PDCCH further indicates the timing of sending the reference signal, so that the UE can start to receive the reference signal after N4 slots from receiving the fourth PDCCH, which not only reserves the radio frequency switching time of the UE but also clarifies the timing relationship for the UE to receive the reference signal, further speeds up the switching of the UE's working bandwidth, saves the power consumption of the UE, and also saves the system signaling overhead.

In one embodiment, the method further includes:

sending a fifth PDCCH to the UE through the second carrier/second BWP, where the fifth PDCCH carries indication information for scheduling a PDSCH or PUSCH on the first carrier/first BWP.

In the embodiments, after receiving the fifth PDCCH, the UE can schedule the PDSCH or PUSCH on the first carrier according to the indication information carried by the fifth PDCCH, which further accelerates the speed of the UE to switch the working bandwidth, saves the power consumption of the UE, and also saves the system signaling overhead.

In one embodiment, the fifth PDCCH further carries a parameter N5 for indicating the timing of scheduling the PDSCH or PUSCH; and the method further includes:

starting to send the PDSCH or receive the PUSCH after N5 slots from sending the fifth PDCCH to the UE through the second carrier/second BWP.

In the embodiments, the fifth PDCCH further indicates the timing for the network-side device to schedule the PDSCH or PUSCH, so that the UE can receive the PDSCH or PUSCH data after N5 slots from receiving the first PDCCH according to the indication of the fifth PDCCH, which further accelerates the switching of the UE working bandwidth, saves the power consumption of the UE, and also saves the system signaling overhead.

In one embodiment, the first carrier/first BWP and the second carrier/second BWP belong to a same base station/network node; or the first carrier/first BWP and the second carrier/second BWP belong to different base stations/network nodes.

In a second aspect, embodiments of the present application provide a method for configuring a transmission bandwidth, which is applied to a UE and includes:

receiving a PDCCH sent by a second carrier/second BWP, where the PDCCH carries indication information for activating a first carrier/first BWP and sending a reference signal on the first carrier/BWP;

activating the first carrier/BWP and receiving the reference signal according to the PDCCH.

In the embodiments, the UE receives the PDCCH sent by the network-side device and activates a new carrier/BWP according to the indication information carried by the PDCCH. Compared with the prior art, in which MAC layer signaling is used to activate a new carrier/BWP, this solution may be more quick, which can effectively speed up the switching of the working bandwidth of the UE, reduce the waiting time of the UE, and then save the power of the UE.

In one embodiment, the indication information activating the first carrier/first BWP at least includes an ID of the first carrier/first BWP.

Through the embodiments, the UE can confirm the carrier or BWP that needs to be activated.

In one embodiment, receiving a PDCCH sent by a second carrier/second BWP, includes:

receiving a PDCCH sent by a second carrier/second BWP, and the PDCCH is specifically a first PDCCH that carries indication information for activating the first carrier/first BWP and sending a reference signal on the first carrier/BWP.

In the embodiments, according to the first PDCCH indicating the activation of the new carrier/BWP and simultaneously indicating the transmission of the reference signal on the new carrier/BWP, the UE can quickly complete the synchronous tracking and CSI measurement of the new carrier/BWP, which further speeds up the bandwidth switching, reduces the power consumption of the UE, and also saves the system signaling overhead.

In one embodiment, the first PDCCH further carries a parameter N1 for indicating the timing of sending the reference signal;

the receiving the reference signal according to the PDCCH, includes:

receiving the reference signal after N1 slots from receiving the first PDCCH.

In the embodiments, the first PDCCH further indicates the timing of sending the reference signal, so that the UE can start to receive the reference signal after N1 slots from receiving the first PDCCH, which not only reserves the radio frequency switching time but also clarifies the timing relationship for the reception of the reference signal, further speeds up the switching of the UE's working bandwidth, saves the power consumption of the UE, and also saves the system signaling overhead.

In one embodiment, the first PDCCH further carries indication information for scheduling a PDSCH or PUSCH on the first carrier/first BWP.

In the embodiments, after receiving the first PDCCH, the UE can schedule the PDSCH or PUSCH on the first carrier according to the indication information carried by the first PDCCH, which further accelerates the speed of the UE to switch the working bandwidth, saves the power consumption of the UE, and also saves the system signaling overhead.

In one embodiment, the first PDCCH further carries a parameter N2 for indicating the timing of scheduling the PDSCH or PUSCH; and the method further includes:

starting to receive the PDSCH or send the PUSCH after N2 slots from receiving the first PDCCH.

In the embodiments, the first PDCCH further indicates the timing for the network-side device to schedule the PDSCH or PUSCH, so that the UE can receive the PDSCH or PUSCH data after N2 slots from receiving the first PDCCH according to the indication of the first PDCCH, which further accelerates the switching of the UE working bandwidth, saves the power consumption of the UE, and also saves the system signaling overhead.

In one embodiment, the method further includes:

receiving a second PDCCH sent by the second carrier/second BWP, and the second PDCCH carries indication information for scheduling a PDSCH or PUSCH on the first carrier/first BWP.

In the embodiments, the UE can schedule PDSCH or PUSCH on the first carrier according to the indication information carried by the second PDCCH, so that the carrier activation can be separated from data scheduling, and the network can control the timing of carrier activation flexibly.

In the embodiments, the UE can receive the PDSCH or send the PUSCH data after N3 slots from receiving the second PDCCH according to the indication of the second PDCCH, which can accurately control the data scheduling time, further speed up the switching of the UE's working bandwidth, and save the power consumption of the UE.

In one embodiment, the second PDCCH further carries a parameter N3 for indicating the timing of scheduling the PDSCH or PUSCH; and the method further includes:

starting to receive the PDSCH or send the PUSCH after N3 slots from receiving the second PDCCH.

In the embodiments, the UE activates the first carrier/BWP and receives the reference signal respectively according to the third PDCCH and the fourth PDCCH, and completes the synchronous tracking and CSI measurement of the new carrier/BWP quickly, which further accelerates the bandwidth switching and ensures the flexibility of network configuration.

In one embodiment, receiving a PDCCH sent by a second carrier/second BWP, includes:

receiving a third PDCCH and a fourth PDCCH sent by the second carrier/second BWP;

where the third PDCCH carries indication information for activating the first carrier/first BWP, and the fourth PDCCH carries indication information for sending a reference signal on the first carrier/first BWP;

activating the first carrier/BWP and receiving the reference signal according to the PDCCH, includes:

activating the first carrier/BWP according to the third PDCCH, and receiving the reference signal according to the fourth PDCCH.

In the embodiments, the UE can start to receive the reference signal after N4 slots from receiving the fourth PDCCH, which not only reserves the radio frequency switching time but also clarifies the timing relationship for the reception of the reference signal, further speeds up the switching of the UE's working bandwidth, saves the power consumption of the UE, and also saves the system signaling overhead.

In one embodiment, the fourth PDCCH further carries a parameter N4 for indicating the timing of sending the reference signal;

the receiving the reference signal according to the fourth PDCCH, includes:

receiving the reference signal sent by the first carrier/first BWP after N4 slots from receiving the fourth PDCCH;

after receiving the reference signal, the method further includes:

performing a channel measurement and synchronous tracking on the first carrier/first BWP according to the reference signal.

In the embodiments, after receiving the fifth PDCCH, the UE can schedule the PDSCH or PUSCH on the first carrier according to the indication information carried by the fifth PDCCH, which further accelerates the speed of the UE to switch the working bandwidth, saves the power consumption of the UE, and also saves the system signaling overhead.

In one embodiment, the method further includes:

receiving a fifth PDCCH sent by the second carrier/second BWP, and the fifth PDCCH carries indication information for scheduling a PDSCH or PUSCH on the first carrier/first BWP.

In the embodiments, after receiving the fifth PDCCH, the UE can schedule the PDSCH or PUSCH on the first carrier according to the indication information carried by the fifth PDCCH, which further accelerates the speed of the UE to switch the working bandwidth, saves the power consumption of the UE, and also saves the system signaling overhead.

In one embodiment, the fifth PDCCH further carries a parameter N5 for indicating the timing of scheduling the PDSCH or PUSCH; and the method further includes:

starting to receive the PDSCH or send the PUSCH after N5 slots from receiving the fifth PDCCH.

In the embodiments, the UE can receive the PDSCH or PUSCH data after N5 slots from receiving the first PDCCH according to the indication of the fifth PDCCH, which further accelerates the switching of the UE working bandwidth, saves the power consumption of the UE, and also saves the system signaling overhead.

In one embodiment, the first carrier/first BWP and the second carrier/second BWP belong to a same base station/network node; or the first carrier/first BWP and the second carrier/second BWP belong to different base stations/network nodes.

In a third aspect, embodiments of the present application provides a device for configuring a transmission bandwidth, including:

a processor, a memory and a communication interface;

and the memory stores instructions that can be executed by the processor;

the processor is configured to determine a first carrier/BWP when executing the instructions;

the communication interface is configured to send a PDCCH to a User Equipment, UE, through a second carrier/second BWP under control of the processor, the PDCCH carrying indication information for activating the first carrier/first BWP and sending a reference signal over the first carrier/first BWP, so that the UE activates the first carrier/first BWP and receives the reference signal; and the reference signal is used by the UE to perform a channel measurement and synchronous tracking on the first carrier/first BWP.

In one embodiment, the indication information activating the first carrier/first BWP at least includes an ID of the first carrier/first BWP.

In one embodiment, the communication interface is configured to:

send a PDCCH to the UE through the second carrier/second BWP, and the PDCCH is specifically a first PDCCH, so that the UE activates the first carrier/first BWP and receives the reference signal.

In one embodiment, the first PDCCH further carries a parameter N1 for indicating the timing of sending the reference signal;

the communication interface is configured to: send the reference signal to the UE through the first carrier/first BWP after N1 slots from sending the first PDCCH to the UE through the second carrier/second BWP.

In one embodiment, the first PDCCH further carries indication information for scheduling a PDSCH or PUSCH on the first carrier/first BWP.

In one embodiment, the first PDCCH further carries a parameter N2 for indicating the timing of scheduling the PDSCH or PUSCH;

the communication interface is further configured to: start to send the PDSCH or receive the PUSCH after N2 slots from sending the first PDCCH to the UE through the second carrier/second BWP.

In one embodiment, the communication interface is further configured to:

send a second PDCCH to the UE through the second carrier/second BWP, and the second PDCCH carries indication information for scheduling a PDSCH or PUSCH on the first carrier/first BWP.

In one embodiment, the second PDCCH further carries a parameter N3 for indicating the timing of scheduling the PDSCH or PUSCH;

the communication interface is further configured to: start to send the PDSCH or receive the PUSCH after N3 slots from sending the second PDCCH to the UE through the second carrier/second BWP.

In one embodiment, the communication interface is configured to:

send a third PDCCH to the UE through the second carrier/second BWP, so that the UE activates the first carrier/BWP;

send a fourth PDCCH to the UE through the second carrier/second BWP, so that the UE receives the reference signal.

In one embodiment, the fourth PDCCH further carries a parameter N4 for indicating the timing of sending the reference signal;

the communication interface is configured to: send the reference signal to the UE through the first carrier/first BWP after N4 slots from sending the fourth PDCCH to the UE through the second carrier/second BWP.

In one embodiment, the communication interface is further configured to:

send a fifth PDCCH to the UE through the second carrier/second BWP, where the fifth PDCCH carries indication information for scheduling a PDSCH or PUSCH on the first carrier/first BWP.

In one embodiment, the fifth PDCCH further carries a parameter N5 for indicating the timing of scheduling the PDSCH or PUSCH;

the communication interface is further configured to: start to send the PDSCH or receive the PUSCH after N5 slots from sending the fifth PDCCH to the UE through the second carrier/second BWP.

In one embodiment, the first carrier/first BWP and the second carrier/second BWP belong to a same base station/network node; or the first carrier/first BWP and the second carrier/second BWP belong to different base stations/network nodes.

In a fourth aspect, embodiments of the present application provides a device for configuring a transmission bandwidth, including:

a processor, a memory and a communication interface;

and the memory stores instructions that can be executed by the processor;

the communication interface is configured to receive a PDCCH sent by a second carrier/second BWP under control of the processor, and the PDCCH carries indication information for activating a first carrier/first BWP and sending a reference signal on the first carrier/BWP;

the processor is configured to activate the first carrier/BWP according to the PDCCH when executing the instructions;

the communication interface is further configured to receive the reference signal according to the PDCCH under control of the processor.

In one embodiment, the indication information activating the first carrier/first BWP at least includes an ID of the first carrier/first BWP.

In one embodiment, the communication interface is configured to:

receive a PDCCH sent by a second carrier/second BWP, and the PDCCH is specifically a first PDCCH that carries indication information for activating the first carrier/first BWP and sending a reference signal on the first carrier/BWP.

In one embodiment, the first PDCCH further carries a parameter N1 for indicating the timing of sending the reference signal;

the communication interface is configured to: receive the reference signal after N1 slots from receiving the first PDCCH.

In one embodiment, the first PDCCH further carries indication information for scheduling a PDSCH or PUSCH on the first carrier/first BWP.

In one embodiment, the first PDCCH further carries a parameter N2 for indicating the timing of scheduling the PDSCH or PUSCH;

the communication interface is further configured to: start to receive the PDSCH or send the PUSCH after N2 slots from receiving the first PDCCH.

In one embodiment, the communication interface is further configured to:

receive a second PDCCH sent by the second carrier/second BWP, and the second PDCCH carries indication information for scheduling a PDSCH or PUSCH on the first carrier/first BWP.

In one embodiment, the second PDCCH further carries a parameter N3 for indicating the timing of scheduling the PDSCH or PUSCH;

the communication interface is further configured to: start to receive the PDSCH or send the PUSCH after N3 slots from receiving the second PDCCH.

In one embodiment, the communication interface is configured to:

receive a third PDCCH and a fourth PDCCH sent by the second carrier/second BWP; where the third PDCCH carries indication information for activating the first carrier/first BWP, and the fourth PDCCH carries indication information for sending a reference signal on the first carrier/first BWP;

the processor is configured to: activate the first carrier/BWP according to the third PDCCH;

the communication interface is configured to: receive the reference signal according to the fourth PDCCH.

In one embodiment, the fourth PDCCH further carries a parameter N4 for indicating the timing of sending the reference signal;

the communication interface is configured to: receive the reference signal sent by the first carrier/first BWP after N4 slots from receiving the fourth PDCCH;

the processor is further configured to: perform a channel measurement and synchronous tracking on the first carrier/first BWP according to the reference signal after the communication interface receives the reference signal.

In one embodiment, the communication interface is further configured to:

receive a fifth PDCCH sent by the second carrier/second BWP, and the fifth PDCCH carries indication information for scheduling a PDSCH or PUSCH on the first carrier/first BWP.

In one embodiment, the fifth PDCCH further carries a parameter N5 for indicating the timing of scheduling the PDSCH or PUSCH;

the communication interface is further configured to: start to receive the PDSCH or send the PUSCH after N5 slots from receiving the fifth PDCCH.

In one embodiment, the first carrier/first BWP and the second carrier/second BWP belong to a same base station/network node; or the first carrier/first BWP and the second carrier/second BWP belong to different base stations/network nodes.

In a fifth aspect, embodiments of the present application provide an apparatus for configuring a transmission bandwidth, including:

a determining device configured to determine a first carrier/BWP;

a communication device configured to send a PDCCH to a UE through a second carrier/second BWP, the PDCCH carrying indication information for activating the first carrier/first BWP and sending a reference signal over the first carrier/first BWP, to allow the UE to activate the first carrier/first BWP and receive the reference signal; and the reference signal is used by the UE to perform a channel measurement and synchronous tracking on the first carrier/first BWP.

In a sixth aspect, embodiments of the present application provide an apparatus for configuring a transmission bandwidth, including:

a communication device configured to receive a PDCCH sent by a second carrier/second BWP, and the PDCCH carries indication information for activating a first carrier/first BWP and sending a reference signal on the first carrier/BWP;

a processing device configured to activate the first carrier/BWP according to the PDCCH;

the communication device is further configured to: receive the reference signal according to the PDCCH.

In a seventh aspect, embodiments of the present application provides a computer readable storage medium storing the computer instructions, which cause a computer to perform the method as described in the first or second aspect of the embodiments of the present application when running on the computer.

The embodiments of the present application, the network-side device instructs the UE to activate a new carrier/BWP and receive a reference signal by sending the PDCCH and using the dynamic DCI signaling, and the UE performs the channel measurement and synchronous tracking on the new carrier/BWP based on the received reference signal. Compared with the prior art, in which MAC layer signaling is used to activate a new carrier/BWP, this solution can be more quick, effectively speed up the switching of the working bandwidth of the UE, reduce the waiting time of the UE, and then save the power of the UE.

BRIEF DESCRIPTION OF THE DRAWINGS

The embodiments of the present application more clearly, the accompanying figures which need to be used in describing the embodiments will be introduced below briefly. The accompanying figures described below are only some embodiments of the present application.

DETAILED DESCRIPTION OF THE EMBODIMENTS

Figure 1:
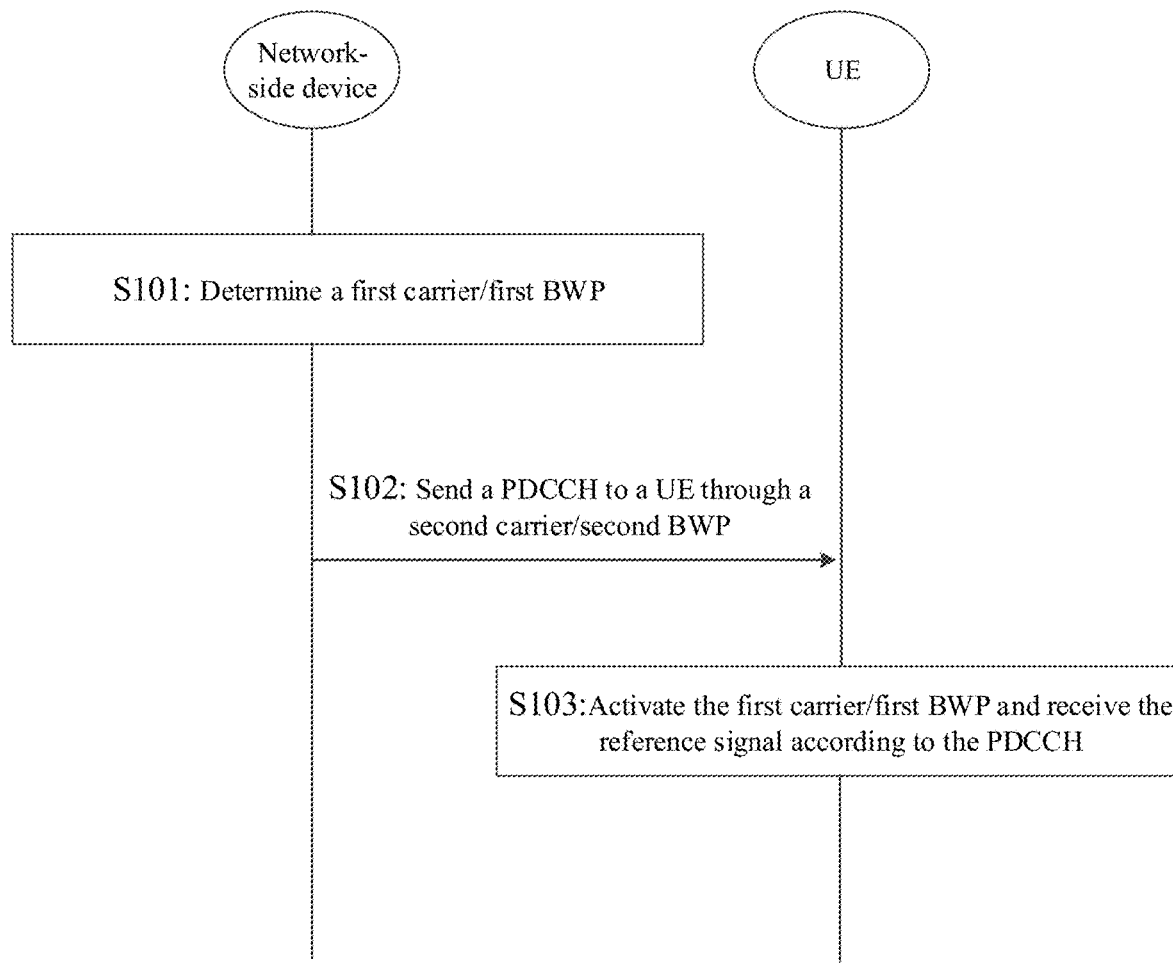
FIG. 1 is a schematic flowchart of a method for configuring a transmission bandwidth in embodiments of the present application.

The embodiments of the present application will be illustrated below in details by way of the drawings and specific embodiments.

It should be understood that the word such as "first" or "second" in the description of the embodiments of the present application is only for purpose of distinguishing the description, and cannot be construed to indicate or imply the relative importance and cannot be construed to indicate or imply the order either. In the description of the embodiments of the present application, "a plurality of" refers to two or more.

The term "and/or" in the embodiments of the present application is simply an association relationship describing the associated objects, indicating that there may be three relationships, for example, A and/or B may represent: only A, both A and B, and only B. Furthermore, the character "/" herein generally indicates that the associated objects have a kind of "or" relationship.

The embodiments of the present application can be applicable to the 5G system; and can also be applicable to other wireless communication systems, e.g., Long Term Evolution (LTE) system, Global System for Mobile Communication (GSM), Universal Mobile Telecommunications System (UMTS), Code Division Multiple Access (CDMA) system, new network device systems and the like.

The UE involved in the embodiments of the present application can refer to the device for providing the voice and/or data connectivity to the user, the handheld device with the wireless connection function, or other processing device connected to the wireless modem. The wireless user terminal can communicate with one or more core networks via the Radio Access Network (RAN), and the wireless user terminal can be a mobile terminal, such as a mobile telephone (or called "cellular" telephone), and a computer with the mobile terminal, for example, can be a portable, pocket, handheld, computer built-in or vehicle-carried mobile device, and they exchange the voice and/or data with the radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless user terminal can also be called system, Subscriber Unit, Subscriber Station, Mobile Station, Mobile Station, Remote Station, Access Point, Remote Terminal, Access Terminal, User Terminal, User Agent, User Device.

The base station involved in the embodiments of the present application can be used to perform the interconversion between the received air frame and the IP packet, and used as the router between the wireless terminal device and the rest of the access network, and the rest of the access network may include Internet Protocol (IP) network devices. The base station can further coordinate the attribute management of the air interface. For example, the base station can be the network device in the 5G system, such as Next generation Node B (gNB), or can be the Base Transceiver Station (BTS) in the GSM or CDMA, or can be the NodeB in the Wideband Code Division Multiple Access (WCDMA), or can be the evolutional Node B (eNB or e-NodeB) in the LTE, which is not limited by the embodiments of the present application.

Referring to FIG. 1, embodiments of the present application provide a method for configuring a transmission bandwidth, including the following.

S101: a network-side device determines a first carrier/first BWP.

S102: the network-side device sends a Physical Downlink Control Channel (PDCCH) to a UE through a second carrier/second BWP.

Here, the PDCCH carries the indication information for activating the first carrier/first BWP, and the indication information for sending a reference signal on the first carrier/BWP. The indication information for activating the first carrier/first BWP at least includes the identification (ID) of the carrier/BWP that needs to be activated, i.e., the first carrier/first BWP. The indication information for activating the first carrier/first BWP is specifically located in the (Downlink Control Information (DCI) on the PDCCH.

Here, the first carrier/first BWP and the second carrier/second BWP belong to a same base station/network node; or the first carrier/first BWP and the second carrier/second BWP belong to different base stations/network nodes. For example, assuming that the carriers that need to be activated are carrier 1 and carrier 2 respectively, then the carrier 1 and carrier 2 can belong to the same base station or belong to the same network node, or the carrier 1 and carrier 2 belong to two different base stations respectively, or the carrier 1 and carrier 2 belong to two different network nodes respectively. For another example, assuming that the BWPs that need to be activated are BWP1 and BWP2 respectively, then the BWP1 and BWP2 can belong to the same base station or belong to the same network node, or the BWP1 and BWP2 belong to two different base stations respectively, or the BWP1 and BWP2 belong to two different network nodes respectively.

In the embodiments of the present application, the network-side device may be any device with wireless transceiver function or a chip that can be set in the device, including but not limited to: a base station (NodeB), an evolved base station (eNodeB), a network equipment (such as Transmission Point (TP), Transmission Reception Point (TRP), base station, small base station equipment, etc.) in the fifth generation (5G) communication system, a network equipment in the future communication system, an access node in the Wireless-Fidelity (WiFi) system, a wireless relay node, a wireless backhaul node, etc.

In the embodiments of the present application, the reference signal is an aperiodic reference signal used by the UE for measuring the downlink channel and downlink synchronization, and the reference signal contains a relatively dense pattern. Since it needs to be sent only when the carrier/BWP is activated, it can be called On-demand Reference Signal (On-demand RS). The on-demand RS is a pilot reference signal sent on demand, and used to be sent when the carrier or BWP is switched. When the UE learns a new on-demand RS, the UE can perform the calibration of synchronous frequency and phase on this signal, and also measure the wireless channel to obtain the distribution characteristics such as space, power and multipath of the channel.

In a specific implementation process, the On-demand RS may be the upgrade and modification of the TRS tracking RS in the existing standard, or may be another newly-designed reference signal, which is not specifically limited In the embodiments of the present application.

In a specific implementation process, the indication information for activating the reference signal transmission and the indication information for activating the first carrier/first BWP are composed of one or more information fields in the DCI on the PDCCH.

S103: the UE activates the first carrier/BWP and receives the reference signal according to the PDCCH after receiving the PDCCH.

In the above solution, the network-side device instructs the UE to activate a new carrier/BWP and receive a reference signal by sending the PDCCH and using the dynamic DCI signaling, and the UE performs the channel measurement and synchronous tracking on the new carrier/BWP based on the received reference signal. Compared with the prior art in which MAC layer signaling is used to activate a new carrier/BWP, this solution can be more quick, effectively speed up the switching of the working bandwidth of the UE, reduce the waiting time of the UE, and then save the power of the UE.

In the embodiments of the present application, one PDCCH can be used to simultaneously indicate the activation of the first carrier/first BWP and the transmission of the reference signal, or two different PDCCHs can be respectively used to indicate the activation of the first carrier/first BWP and the transmission of the reference signal. Next, these two cases will be introduced respectively.

In the first case: the network-side device sends one PDCCH that simultaneously indicates the activation of the first carrier/first BWP and the transmission of the reference signal over the second carrier/second BWP.

In specific embodiments: the network-side device sends a first PDCCH to the UE through the second carrier/second BWP, to allow the UE to activate the first carrier/first BWP and to receive the reference signal. Correspondingly, after receiving the PDCCH sent by the second carrier/second BWP, the UE activates the first carrier/first BWP and receives the reference signal according to the PDCCH.

In a specific implementation process, the first PDCCH further carries a parameter N1 for indicating the timing of sending the reference signal. The method further includes: sending the reference signal to the UE through the first carrier/first BWP after N1 slots from sending the first PDCCH to the UE through the second carrier/second BWP. Correspondingly, the UE receives the reference signal after N1 slots from receiving the first PDCCH. In this way, the UE can start to receive the reference signal after N1 slots from receiving the first PDCCH, which not only reserves the radio frequency switching time of the UE but also clarifies the timing relationship for the UE to receive the reference signal, further speeds up the switching of the UE's working bandwidth, saves the power consumption of the UE, and also saves the system signaling overhead.

In a specific implementation process, in order to further speed up the bandwidth switching and reduce the power consumption of the UE, the network-side device may further send a PDCCH to the UE to indicate the data channel scheduling of a new carrier/BWP. Specific embodiments include but not limited to the following two embodiments.

1) Indicate the data channel scheduling of the first carrier/first BWP directly through the first PDCCH. Specifically, the first PDCCH further carries the indication information for scheduling a Physical Downlink Shared CHannel (PDSCH) or Physical Uplink Shared Channel (PUSCH) on the first carrier/first BWP. Correspondingly, after receiving the first PDCCH, the UE receives the PDSCH or sends the PUSCH on the first carrier/first BWP according to the first PDCCH.

Further, the first PDCCH further may further include a parameter N2 for indicating the timing of scheduling the PDSCH or PUSCH; then the method further includes: the network-side device starts to send the PDSCH or receive the PUSCH after N2 slots from sending the first PDCCH to the UE through the second carrier/second BWP. Correspondingly, the UE starts to receive the PDSCH or send the PUSCH after N2 slots from receiving the first PDCCH. In this way, after receiving the first PDCCH, the UE can schedule the PDSCH or PUSCH on the first carrier according to the indication information on the first PDCCH, which further accelerates the speed of the UE to switch the working bandwidth, saves the power consumption of the UE, and also saves the system signaling overhead.

2) Send a second PDCCH to the UE through the second carrier/second BWP, where the second PDCCH carries the indication information for scheduling a PDSCH or PUSCH on the first carrier/first BWP. Correspondingly, after receiving the second PDCCH, the UE receives the PDSCH or sends the PUSCH on the first carrier/first BWP according to the second PDCCH.

Further, the second PDCCH may further include a parameter N3 for indicating the timing of scheduling the PDSCH or PUSCH; then the method further includes: the network-side device starts to send the PDSCH or receive the PUSCH after N3 slots from sending the second PDCCH to the UE through the second carrier/second BWP. Correspondingly, the UE starts to receive the PDSCH or send the PUSCH after N3 slots from receiving the second PDCCH. In this way, the UE can schedule PDSCH or PUSCH on the first carrier according to the indication information carried by the second PDCCH, so that the carrier activation can be separated from data scheduling, and the network can control the timing of carrier activation flexibly.

In the second case: the network-side device sends two different PDCCHs that respectively indicate the activation of the first carrier/first BWP and the transmission of the reference signal over the second carrier/second BWP.

In specific embodiments: the network-side device sends a third PDCCH to the UE through the second carrier/second BWP, so that the UE activates the first carrier/first BWP; and sends a fourth PDCCH to the UE through the second carrier/second BWP, to allow the UE to receive the reference signal. Correspondingly, the UE activates the first carrier/first BWP according to the third PDCCH, and receives the reference signal according to the fourth PDCCH. In this way, the carrier activation and reference signal signaling can be designed independently, which not only allows the dynamic switching to save the activation time but also ensures the flexibility of network configuration.

Further, the fourth PDCCH further carries a parameter N4 for indicating the timing of sending the reference signal; and the method further includes: sending the reference signal to the UE through the first carrier/first BWP after N4 slots from sending the fourth PDCCH to the UE through the second carrier/second BWP. Correspondingly, the UE receives the reference signal sent by the first carrier/first BWP after N4 slots from receiving the fourth PDCCH; and performs the channel measurement and synchronous tracking on the first carrier/first BWP according to the reference signal. In this way, the fourth PDCCH further indicates the timing of sending the reference signal, so that the UE can start to receive the reference signal after N4 slots from receiving the fourth PDCCH, which not only reserves the radio frequency switching time of the UE but also clarifies the timing relationship for the UE to receive the reference signal, further speeds up the switching of the UE's working bandwidth, saves the power consumption of the UE, and also saves the system signaling overhead.

Similar to the first case, in a specific implementation process, in order to further speed up the bandwidth switching and reduce the power consumption of the UE, the network-side device may further send a PDCCH to the UE to indicate the data channel scheduling of a new carrier/BWP in the second case. A specific embodiment includes: the network-side device sends a fifth PDCCH to the UE through the second carrier/second BWP, and the fifth PDCCH carries the indication information for scheduling a PDSCH or PUSCH on the first carrier/first BWP. In this way, after receiving the fifth PDCCH, the UE can schedule the PDSCH or PUSCH on the first carrier according to the indication information carried by the fifth PDCCH, which further accelerates the speed of the UE to switch the working bandwidth, saves the power consumption of the UE, and also saves the system signaling overhead.

Further, the fifth PDCCH may further include a parameter N5 for indicating the timing of scheduling the PDSCH or PUSCH; then the method further includes: starting to send the PDSCH or receive the PUSCH after N5 slots from the fifth PDCCH to the UE through the second carrier/second BWP. Correspondingly, after receiving the fifth PDCCH sent by the second carrier/second BWP, the UE receives the PDSCH or sends the PUSCH on the first carrier/first BWP according to the indication information carried by the fifth PDCCH. In this way, the UE can receive the PDSCH or PUSCH data after N5 slots from receiving the first PDCCH according to the indication of the fifth PDCCH, which further accelerates the switching of the UE working bandwidth, saves the power consumption of the UE, and also saves the system signaling overhead.

Figure 8:
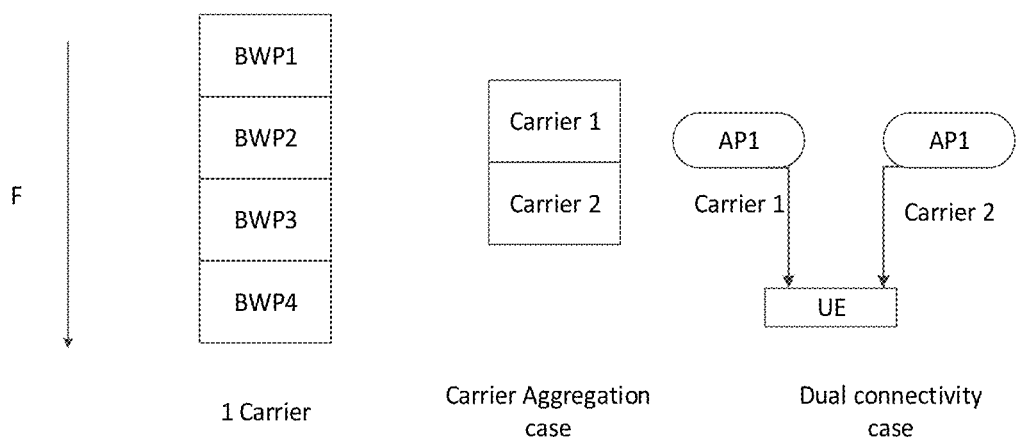
FIG. 8 is a schematic diagram of BWP, carrier aggregation, and dual link in embodiments of the present application.

The embodiments of the present application may be applicable to any application scenarios that require the carrier switching or activation, and the embodiments of the present application do not make specific limitations. For example, referring to FIG. 8, this figure illustrates the carrier allocation of the UE in three different working modes, namely BWP mode, carrier aggregation mode and Dual Connectivity (DC) mode. The embodiments of the present application are all applicable in these three scenarios. When the UE is configured in the DC mode, the UE can connect to two base stations, where one base station works on one carrier. At this time, the UE can realize the dynamic carrier activation according to DCI signaling, that is, both connections can be activated or deactivated through dynamic DCI signaling.

The embodiments of the present application which describe the foregoing bandwidth configuration method will be illustrated below in details by way of two possible specific embodiments.

Figure 2:
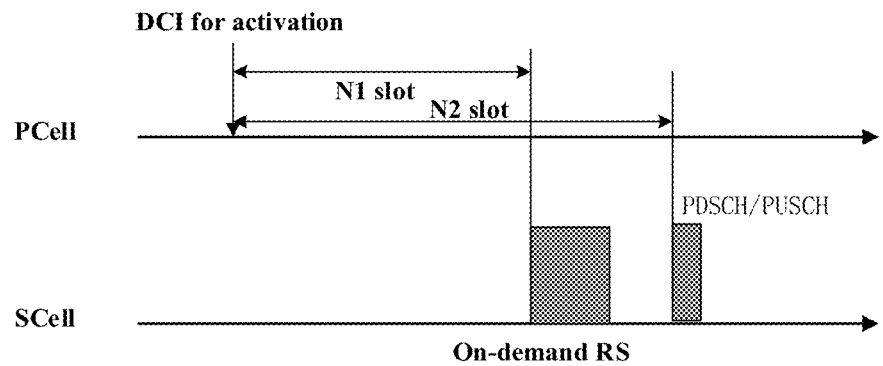
FIG. 2 is a schematic diagram of indicating the carrier activation and on-demand RS transmission by using one PDCCH in embodiments of the present application.

First Embodiment: One PDCCH is Used to Simultaneously Indicate the Carrier Activation and Data Channel Scheduling Referring to FIG. 2, the specific implementation steps of this embodiment include the following.

(1) The network-side device sends a DCI on the primary carrier PCell (Primary Cell) to indicate the activation of the secondary carrier SCell (Secondary Cell), where the DCI contains the ID of the SCell, and the scheduling resource indication of PDSCH or PUSCH. Further, the DCI may also include parameters N1 and N2 which are respectively used to indicate the timing of the on-demand RS (the network-side device sends the on-demand RS after N1 slots from sending the DCI) and the timing of the data channel (the network-side device sends or receives the data channel after N2 slots from sending the DCI).

(2) The network-side device sends the on-demand RS to the UE after N1 slots from sending the DCI, to allow the UE to perform the channel measurement and synchronous tracking on the SCell according to the on-demand RS.

(3) The network-side device sends the PDSCH or receives the PUSCH on the SCell after N2 slots from sending the DCI. Correspondingly, the UE performs the corresponding receiving and sending operations of channel data on the SCell.

In the embodiments, the network-side device sends one PDCCH to simultaneously indicate the carrier activation and on-demand RS transmission, so that the UE performs the channel tracking and synchronous tracking on the new carrier according to the DCI indication on the PDCCH, and determines the timing relationship between on-demand RS transmission and channel data scheduling according to the DCI indication information. The UE can detect the on-demand RS and data channel information according to the specified timing relationship, which can effectively speed up the switching of the working bandwidth of the UE and save the power of the UE.

Figure 3:
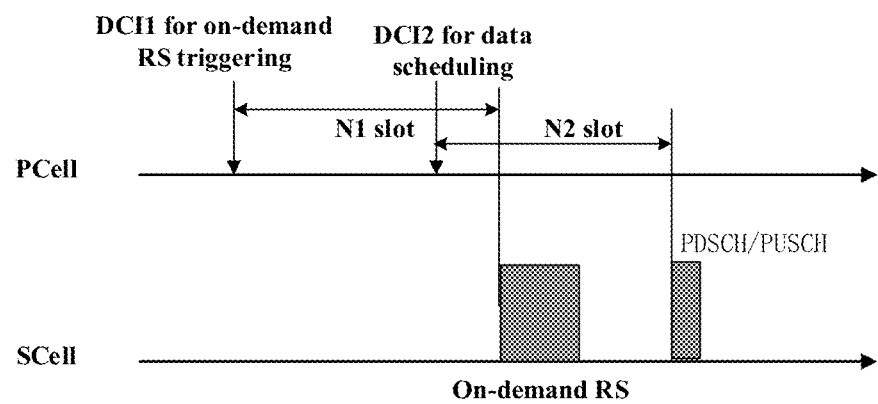
FIG. 3 is a schematic diagram of indicating the carrier activation and on-demand RS transmission by two different PDCCHs respectively in embodiments of the present application.

Second Embodiment: Two Different PDCCHs to Indicate the Carrier Activation and Data Channel Scheduling Respectively Referring to FIG. 3, the specific implementation steps of this embodiment include the following.

(1) The network-side device sends a first PDCCH on the primary carrier PCell, where the DCI on this PDCCH is for the on-demand RS triggering, and the DCI contains the ID of the SCell; and further, the DCI can also contain a parameter N1 used to indicate that the on-demand RS is sent after N1 slots from the DCI is sent.

(2) After K slots from sending the first PDCCH, the network-side device sends a second PDCCH, where the DCI on this second PDCCH indicates the transmission of the PDSCH or PUSCH of the SCell, and the DCI contains the ID of the SCell and can also contain a parameter N2 used to indicate that the PDSCH or PUSCH is transmitted after N2 slots from the DCI is sent.

(3) The network-side device sends the on-demand RS to the UE after N1 slots from sending the first PDCCH, to allow the UE to perform the channel measurement and synchronous tracking on the SCell according to the on-demand RS.

(4) The network-side device sends the PDSCH or receives the PUSCH on the SCell after N2 slots from sending the second PDCCH.

In the embodiments, the network-side device sends two PDCCHs with the interval of K slots to indicate the carrier activation and on-demand RS transmission respectively, so that the UE performs the channel detection and synchronous tracking on the new carrier according to the DCI on the two PDCCHs, and determines the timing relationship between on-demand RS transmission and data channel scheduling. The UE can detect the on-demand RS and data channel information according to this timing relationship, which can effectively speed up the switching of the working bandwidth of the UE and save the power of the UE.

It should be noted that the foregoing embodiment is only an example for the carrier activation and configuration. In a specific implementation process, the method of the foregoing embodiment is also applicable to the BWP configuration.

Figure 4:
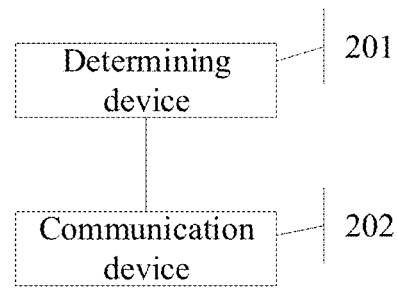
FIG. 4 is a structural schematic diagram of an apparatus for configuring a transmission bandwidth in embodiments of the present application.

Based on the same inventive concept, embodiments of the present application further provide an apparatus for configuring a transmission bandwidth. Referring to FIG. 4, the apparatus includes:

a determining device 201 configured for determining a first carrier/BWP;

a communication device 202 configured for sending a PDCCH to a UE through a second carrier/second BWP, the PDCCH carrying the indication information for activating the first carrier/first BWP and sending a reference signal over the first carrier/first BWP, to allow the UE to activate the first carrier/first BWP and to receive the reference signal; and the reference signal is used by the UE to perform the channel measurement and synchronous tracking on the first carrier/first BWP.

In one embodiment, the indication information for activating the first carrier/first BWP at least includes an ID of the first carrier/first BWP.

In one embodiment, the communication device 202 is configured for: sending one PDCCH to the UE through the second carrier/second BWP, and said one PDCCH is a first PDCCH, so that the UE activates the first carrier/first BWP and receives the reference signal.

In one embodiment, the first PDCCH further carries a parameter N1 for indicating the timing of sending the reference signal; and the communication device 202 is configured for: sending the reference signal to the UE through the first carrier/first BWP after N1 slots from sending the first PDCCH to the UE through the second carrier/second BWP.

In one embodiment, the first PDCCH further carries the indication information for scheduling a PDSCH or PUSCH on the first carrier/first BWP.

In one embodiment, the first PDCCH further carries a parameter N2 for indicating the timing of scheduling the PDSCH or PUSCH; and the communication device 202 is further configured for: starting to send the PDSCH or receive the PUSCH after N2 slots from sending the first PDCCH to the UE through the second carrier/second BWP.

In one embodiment, the communication device 202 is further configured for: sending a second PDCCH to the UE through the second carrier/second BWP, and the second PDCCH carries the indication information for scheduling a PDSCH or PUSCH on the first carrier/first BWP.

In one embodiment, the second PDCCH further carries a parameter N3 for indicating the timing of scheduling the PDSCH or PUSCH; and the communication device 202 is further configured for: starting to send the PDSCH or receive the PUSCH after N3 slots from sending the second PDCCH to the UE through the second carrier/second BWP.

In one embodiment, the communication device 202 is configured for: sending a third PDCCH to the UE through the second carrier/second BWP, to allow the UE to activate the first carrier/BWP; and send a fourth PDCCH to the UE through the second carrier/second BWP, to allow the UE to receive the reference signal.

In one embodiment, the fourth PDCCH further carries a parameter N4 for indicating the timing of sending the reference signal; and the communication device 202 is configured for: sending the reference signal to the UE through the first carrier/first BWP after N4 slots from sending the fourth PDCCH to the UE through the second carrier/second BWP.

In one embodiment, the communication device 202 is further configured for: sending a fifth PDCCH to the UE through the second carrier/second BWP, and the fifth PDCCH carries the indication information for scheduling a PDSCH or PUSCH on the first carrier/first BWP.

In one embodiment, the fifth PDCCH further carries a parameter N5 for indicating the timing of scheduling the PDSCH or PUSCH; and the communication device 202 is further configured for: starting to send the PDSCH or receive the PUSCH after N5 slots from sending the fifth PDCCH to the UE through the second carrier/second BWP.

In one embodiment, the first carrier/first BWP and the second carrier/second BWP belong to a same base station/network node; or the first carrier/first BWP and the second carrier/second BWP belong to different base stations/network nodes.

For the specific implementations of the operations performed by the above devices, the reference may be made to the specific implementations of the network-side device when performing the corresponding operations in the foregoing method for configuring the bandwidth in the embodiments of the present application, which will not be repeated in the embodiments of the present application.

Figure 5:
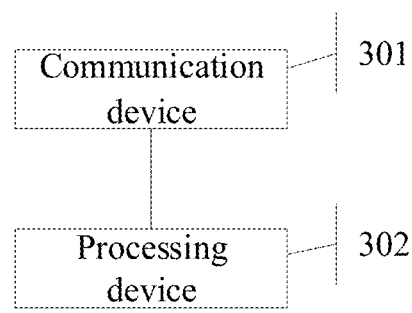
FIG. 5 is a structural schematic diagram of an apparatus for configuring a transmission bandwidth in embodiments of the present application.

Based on the same inventive concept, embodiments of the present application further provide an apparatus for configuring a transmission bandwidth. Referring to FIG. 5, the apparatus includes:

a communication device 301 configured for receiving a PDCCH sent by a second carrier/second BWP, and the PDCCH carries the indication information for activating a first carrier/first BWP and sending a reference signal on the first carrier/BWP;

a processing device 302 configured for activating the first carrier/BWP according to the PDCCH;

the communication device 301 is further configured for: receiving the reference signal according to the PDCCH.

In one embodiment, the indication information for activating the first carrier/first BWP at least includes an ID of the first carrier/first BWP.

In one embodiment, the communication device 301 is configured for: receiving one PDCCH sent by a second carrier/second BWP, and said one PDCCH is a first PDCCH that carries the indication information for activating the first carrier/first BWP and sending a reference signal on the first carrier/BWP.

In one embodiment, the first PDCCH further carries a parameter N1 for indicating the timing of sending the reference signal; and the communication device 301 is configured for: receiving the reference signal after N1 slots from receiving the first PDCCH.

In one embodiment, the first PDCCH further carries the indication information for scheduling a PDSCH or PUSCH on the first carrier/first BWP.

In one embodiment, the first PDCCH further carries a parameter N2 for indicating the timing of scheduling the PDSCH or PUSCH; and the communication device 301 is further configured for: starting to receive the PDSCH or send the PUSCH after N2 slots from receiving the first PDCCH.

In one embodiment, the receiving device is further configured for: receiving a second PDCCH sent by the second carrier/second BWP, where the second PDCCH carries the indication information for scheduling a PDSCH or PUSCH on the first carrier/first BWP.

In one embodiment, the second PDCCH further carries a parameter N3 for indicating the timing of scheduling the PDSCH or PUSCH; and the receiving device is further configured for: starting to receive the PDSCH or send the PUSCH after N3 slots from receiving the second PDCCH.

In one embodiment, the receiving device is configured for: receiving a third PDCCH and a fourth PDCCH sent by the second carrier/second BWP; where the third PDCCH carries the indication information for activating the first carrier/first BWP, and the fourth PDCCH carries the indication information for sending a reference signal on the first carrier/first BWP; the processing device 302 is configured for: activating the first carrier/BWP according to the third PDCCH; and the communication device 301 is configured for: receiving the reference signal according to the fourth PDCCH.

In one embodiment, the fourth PDCCH further carries a parameter N4 for indicating the timing of sending the reference signal; the communication device 301 is configured for: receiving the reference signal sent by the first carrier/first BWP after N4 slots from receiving the fourth PDCCH; and the processing device 302 is further configured for: performing the channel measurement and synchronous tracking on the first carrier/first BWP according to the reference signal after the communication device 301 receives the reference signal.

In one embodiment, the receiving device is further configured for: receiving a fifth PDCCH sent by the second carrier/second BWP, where the fifth PDCCH carries the indication information for scheduling a PDSCH or PUSCH on the first carrier/first BWP.

In one embodiment, the fifth PDCCH further carries a parameter N5 for indicating the timing of scheduling the PDSCH or PUSCH; and the communication device 301 is further configured for: starting to receive the PDSCH or send the PUSCH after N5 slots from receiving the fifth PDCCH.

In one embodiment, the first carrier/first BWP and the second carrier/second BWP belong to a same base station/network node; or the first carrier/first BWP and the second carrier/second BWP belong to different base stations/network nodes.

For the specific implementations of the operations performed by the above devices, the reference may be made to the specific implementations of the UE when performing the corresponding operations in the foregoing method for configuring the bandwidth in the embodiments of the present application, which will not be repeated. In the embodiments of the present application.

Figure 6:
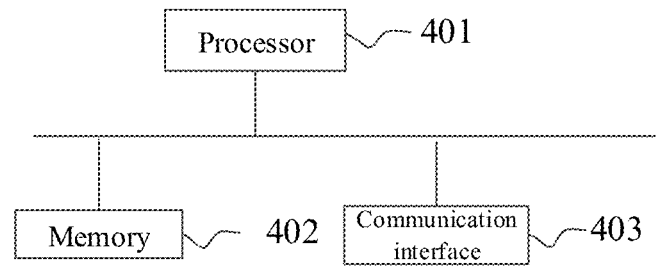
FIG. 6 is a structural schematic diagram of a device for configuring a transmission bandwidth in embodiments of the present application.

Based on the same inventive concept, embodiments of the present application further provide a device for configuring a transmission bandwidth. Referring to FIG. 6, the device includes:

a processor 401, a memory 402 and a communication interface 403;

and the memory 402 stores instructions that can be executed by the processor 401;

the processor 401 is configured for determining a first carrier/BWP when executing the instructions;

the communication interface 403 is configured for sending a PDCCH to a UE through a second carrier/second BWP under control of the processor 401, the PDCCH carrying the indication information for activating the first carrier/first BWP and sending a reference signal over the first carrier/first BWP, to allow the UE to activate the first carrier/first BWP and to receive the reference signal; where the reference signal is used by the UE to perform the channel measurement and synchronous tracking on the first carrier/first BWP.

In one embodiment, the indication information activating the first carrier/first BWP at least includes an ID of the first carrier/first BWP.

In one embodiment, the communication interface 403 is configured for:

sending one PDCCH to the UE through the second carrier/second BWP, where the one PDCCH is a first PDCCH, to allow the UE to activate the first carrier/first BWP and receive the reference signal.

In one embodiment, the first PDCCH further carries a parameter N1 for indicating the timing of sending the reference signal;

the communication interface 403 is configured for: sending the reference signal to the UE through the first carrier/first BWP after N1 slots from sending the first PDCCH to the UE through the second carrier/second BWP.

In one embodiment, the first PDCCH further carries the indication information for scheduling a PDSCH or PUSCH on the first carrier/first BWP.

In one embodiment, the first PDCCH further carries a parameter N2 for indicating the timing of scheduling the PDSCH or PUSCH;

the communication interface 403 is further configured for: starting to send the PDSCH or receive the PUSCH after N2 slots from sending the first PDCCH to the UE through the second carrier/second BWP.

In one embodiment, the communication interface 403 is further configured to:

sending a second PDCCH to the UE through the second carrier/second BWP, where the second PDCCH carries the indication information for scheduling a PDSCH or PUSCH on the first carrier/first BWP.

In one embodiment, the second PDCCH further carries a parameter N3 for indicating the timing of scheduling the PDSCH or PUSCH;

the communication interface 403 is further configured for: starting to send the PDSCH or receive the PUSCH after N3 slots from sending the second PDCCH to the UE through the second carrier/second BWP.

In one embodiment, the communication interface 403 is configured for:

sending a third PDCCH to the UE through the second carrier/second BWP, to allow the UE to activate the first carrier/BWP;

sending a fourth PDCCH to the UE through the second carrier/second BWP, to allow the UE to receive the reference signal.

In one embodiment, the fourth PDCCH further carries a parameter N4 for indicating the timing of sending the reference signal;

the communication interface 403 is configured for: sending the reference signal to the UE through the first carrier/first BWP after N4 slots from sending the fourth PDCCH to the UE through the second carrier/second BWP.

In one embodiment, the communication interface 403 is further configured for:

sending a fifth PDCCH to the UE through the second carrier/second BWP, and the fifth PDCCH carries the indication information for scheduling a PDSCH or PUSCH on the first carrier/first BWP.

In one embodiment, the fifth PDCCH further carries a parameter N5 for indicating the timing of scheduling the PDSCH or PUSCH;

the communication interface 403 is further configured for: starting to send the PDSCH or receive the PUSCH after N5 slots from sending the fifth PDCCH to the UE through the second carrier/second BWP.

In one embodiment, the first carrier/first BWP and the second carrier/second BWP belong to a same base station/network node; or the first carrier/first BWP and the second carrier/second BWP belong to different base stations/network nodes.

Figure 7:
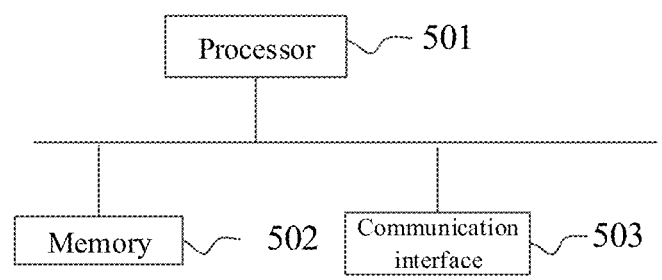
FIG. 7 is a structural schematic diagram of a device for configuring a transmission bandwidth in embodiments of the present application.

Based on the same inventive concept, embodiments of the present application further provide a device for configuring a transmission bandwidth. Referring to FIG. 7, the device includes:

a processor 501, a memory 502 and a communication interface 503;

and the memory 502 stores instructions that can be executed by the processor 501;

the communication interface 503 is configured for receiving a PDCCH sent by a second carrier/second BWP under control of the processor 501, and the PDCCH carries the indication information for activating a first carrier/first BWP and sending a reference signal on the first carrier/BWP;

the processor 501 is configured for activating the first carrier/BWP according to the PDCCH when executing the instructions;

the communication interface 503 is further configured for receiving the reference signal according to the PDCCH under control of the processor 501.

In one embodiment, the indication information activating the first carrier/first BWP at least includes an ID of the first carrier/first BWP.

In one embodiment, the communication interface 503 is configured for:

receiving a PDCCH sent by a second carrier/second BWP, and the PDCCH is specifically a first PDCCH that carries the indication information for activating the first carrier/first BWP and sending a reference signal on the first carrier/BWP.

In one embodiment, the first PDCCH further carries a parameter N1 for indicating the timing of sending the reference signal;

the communication interface 503 is configured for: receiving the reference signal after N1 slots from receiving the first PDCCH.

In one embodiment, the first PDCCH further carries the indication information for scheduling a PDSCH or PUSCH on the first carrier/first BWP.

In one embodiment, the first PDCCH further carries a parameter N2 for indicating the timing of scheduling the PDSCH or PUSCH;

the communication interface 503 is further configured for: starting to receive the PDSCH or send the PUSCH after N2 slots from receiving the first PDCCH.

In one embodiment, the communication interface 503 is further configured for:

receiving a second PDCCH sent by the second carrier/second BWP, and the second PDCCH carries the indication information for scheduling a PDSCH or PUSCH on the first carrier/first BWP.

In one embodiment, the second PDCCH further carries a parameter N3 for indicating the timing of scheduling the PDSCH or PUSCH;

the communication interface 503 is further configured for: starting to receive the PDSCH or send the PUSCH after N3 slots from receiving the second PDCCH.

In one embodiment, the communication interface 503 is configured for:

receiving a third PDCCH and a fourth PDCCH sent by the second carrier/second BWP; and the third PDCCH carries the indication information for activating the first carrier/first BWP, and the fourth PDCCH carries the indication information for sending a reference signal on the first carrier/first BWP;

the processor 501 is configured for: activating the first carrier/BWP according to the third PDCCH;

the communication interface 503 is configured for: receiving the reference signal according to the fourth PDCCH.

In one embodiment, the fourth PDCCH further carries a parameter N4 for indicating the timing of sending the reference signal;

the communication interface 503 is configured for: receiving the reference signal sent by the first carrier/first BWP after N4 slots from receiving the fourth PDCCH;

the processor 501 is further configured for: performing the channel measurement and synchronous tracking on the first carrier/first BWP according to the reference signal after the communication interface receives the reference signal.

In one embodiment, the communication interface 503 is further configured to:

receiving a fifth PDCCH sent by the second carrier/second BWP, and the fifth PDCCH carries the indication information for scheduling a PDSCH or PUSCH on the first carrier/first BWP.

In one embodiment, the fifth PDCCH further carries a parameter N5 for indicating the timing of scheduling the PDSCH or PUSCH;

the communication interface 503 is further configured for: starting to receive the PDSCH or send the PUSCH after N5 slots from receiving the fifth PDCCH.

In one embodiment, the first carrier/first BWP and the second carrier/second BWP belong to a same base station/network node; or the first carrier/first BWP and the second carrier/second BWP belong to different base stations/network nodes.

Based on the same inventive concept, embodiments of the present application further provides a computer readable storage medium storing the computer instructions, which cause a computer to perform the above bandwidth configuration method of the embodiments of the present application when running on the computer.

The embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

What is claimed is:

1. Method for configuring a transmission bandwidth, applied to a network-side device and comprising:

determining a first carrier/first Bandwidth Part, BWP;
sending a Physical Downlink Control Channel, PDCCH, to a User Equipment, UE, through a second carrier/second BWP, the PDCCH carrying indication information for activating the first carrier/first BWP and indication information for sending a reference signal over the first carrier/first BWP, to allow the UE to activate the first carrier/first BWP and receive the reference signal;

wherein the sending the PDCCH to the UE through the second carrier/second BWP, comprises:

sending a first PDCCH to the UE through the second carrier/second BWP, wherein the first PDCCH is configured to instruct the UE to activate the first carrier/first BWP and to receive the reference signal; and sending a second PDCCH to the UE through the second carrier/second BWP, wherein the second PDCCH carries indication information for scheduling a PDSCH or PUSCH on the first carrier/first BWP, or sending a third PDCCH to the UE through the second carrier/second BWP, wherein the third PDDCH is configured to instruct the UE to activate the first carrier/first BWP; sending a fourth PDCCH to the UE through the second carrier/second BWP, wherein the fourth PDCCH is configured to instruct the UE to receive the reference signal, and sending a fifth PDCCH to the UE through the second carrier/second BWP, wherein the fifth PDCCH carries indication information for scheduling a PDSCH or PUSCH on the first carrier/first BWP.

2. The method of claim 1, wherein the indication information for activating the first carrier/first BWP at least comprises an identification, ID, of the first carrier/first BWP.

3. The method of claim 1, wherein the first PDCCH further carries a parameter N1 for indicating a timing of sending the reference signal;
the method further comprises:
sending the reference signal to the UE through the first carrier/first BWP after N1 slots from sending the first PDCCH to the UE through the second carrier/second BWP.

4. The method of claim 1,
wherein the second PDCCH further carries a parameter N3 for indicating a timing of scheduling the PDSCH or PUSCH;
the method further comprises:
starting to send the PDSCH or receive the PUSCH after N3 slots from sending the second PDCCH to the UE through the second carrier/second BWP.

5. The method of claim 1, wherein the fourth PDCCH further carries a parameter N4 for indicating a timing of sending the reference signal; and the method further comprises:
sending the reference signal to the UE through the first carrier/first BWP after N4 slots from sending the fourth PDCCH to the UE through the second carrier/second BWP.

6. The method of claim 1,
wherein the fifth PDCCH further carries a parameter N5 for indicating a timing of scheduling the PDSCH or PUSCH; and the method further comprises:
starting to send the PDSCH or receive the PUSCH after N5 slots from sending the fifth PDCCH to the UE through the second carrier/second BWP.

7. The method of claim 1, wherein the first carrier/first BWP and the second carrier/second BWP belong to a same base station/network node; or the first carrier/first BWP and the second carrier/second BWP belong to different base stations/network nodes.

8. A method for configuring a transmission bandwidth, applied to a UE and comprising:
receiving a Physical Downlink Control Channel, PDCCH sent by a second carrier/second Bandwidth Part, BWP, wherein the PDCCH carries indication information for activating a first carrier/first BWP and sending a reference signal on the first carrier/BWP;
activating the first carrier/BWP and receiving the reference signal according to the PDCCH;
wherein the receiving the PDCCH sent by the second carrier/second BWP, comprises:
receiving a first PDCCH sent by the second carrier/second BWP, wherein the first PDCCH carries indication information for activating the first carrier/first BWP and for sending the reference signal on the first carrier/first BWP; and receiving a second PDCCH sent by the second carrier/second BWP, wherein the second PDCCH carries indication information for scheduling a PDSCH or PUSCH on the first carrier/first BWP;
or
receiving a third PDCCH, a fourth PDCCH and a fifth PDCCH sent by the second carrier/second BWP; wherein the third PDCCH carries indication information for activating the first carrier/first BWP, the fourth PDCCH carries indication information for sending a reference signal on the first carrier/first BWP, and the fifth PDCCH carries indication information for scheduling a PDSCH or PUSCH on the first carrier/first BWP.

9. The method of claim 8, wherein the first PDCCH further carries a parameter N1 for indicating a timing of sending the reference signal;
the receiving the reference signal according to the PDCCH, comprises:
receiving the reference signal after N1 slots from receiving the first PDCCH.

10. The method of claim 8,
wherein the second PDCCH further carries a parameter N3 for indicating a timing of scheduling the PDSCH or PUSCH;
the method further comprises:
starting to receive the PDSCH or send the PUSCH after N3 slots from receiving the second PDCCH.

11. The method of claim 8, wherein
activating the first carrier/BWP and receiving the reference signal according to the PDCCH, comprises:
activating the first carrier/first BWP according to the third PDCCH, and receiving the reference signal according to the fourth PDCCH.

12. The method of claim 11, wherein the fourth PDCCH further carries a parameter N4 for indicating a timing of sending the reference signal;
the receiving the reference signal according to the fourth PDCCH, comprises:
receiving the reference signal sent by the first carrier/first BWP after N4 slots from receiving the fourth PDCCH;
after receiving the reference signal, the method further comprises:
performing a channel measurement and synchronous tracking on the first carrier/first BWP according to the reference signal.

13. The method of claim 11,
wherein the fifth PDCCH further carries a parameter N5 for indicating a timing of scheduling the PDSCH or PUSCH;
the method further comprises:
starting to receive the PDSCH or send the PUSCH after N5 slots from receiving the fifth PDCCH.

14. A device for configuring a transmission bandwidth, comprising:
a processor, a memory and a communication interface;
wherein the memory stores instructions executable by the processor;
the processor is configured, when executing the instructions, for implementing the method of claim 8; and
the communication interface is configured, under control of the processor, for receiving and sending data.

15. A device for configuring a transmission bandwidth, comprising:
a processor, a memory and a communication interface;
wherein the memory stores instructions executable by the processor;
the processor is configured, when executing the instructions, for determining a first carrier/Bandwidth Part, BWP;
the communication interface is configured, under control of the processor, for sending a Physical Downlink Control Channel, PDCCH to a User Equipment, UE, through a second carrier/second BWP, the PDCCH carrying indication information for activating the first carrier/first BWP and sending a reference signal over the first carrier/first BWP, to allow the UE to activate the first carrier/first BWP and receive the reference signal;

wherein the sending the PDDCCH to the UE through the second carrier/second BWP, comprises:

sending a first PDCCH to the UE through the second carrier/second BWP, wherein the first PDCCH is configured to instruct the UE to activate the first carrier/first BWP and to receive the reference signal; and sending a second PDCCH to the UE through the second carrier/second BWP, wherein the second PDCCH carries indication information for scheduling a PDSCH or PUSCH on the first carrier/first BWP;

or sending a third PDCCH to the UE through the second carrier/second BWP, wherein the third PDDCH is configured to instruct the UE to activate the first carrier/first BWP; sending a fourth PDCCH to the UE through the second carrier/second BWP, wherein the fourth PDCCH is configured to instruct the UE to receive the reference signal; and sending a fifth PDCCH to the UE through the second carrier/second BWP, wherein the fifth PDCCH carries indication information for scheduling a PDSCH or PUSCH on the first carrier/first BWP.

* * * * *